UNITED STATES PATENT OFFICE.

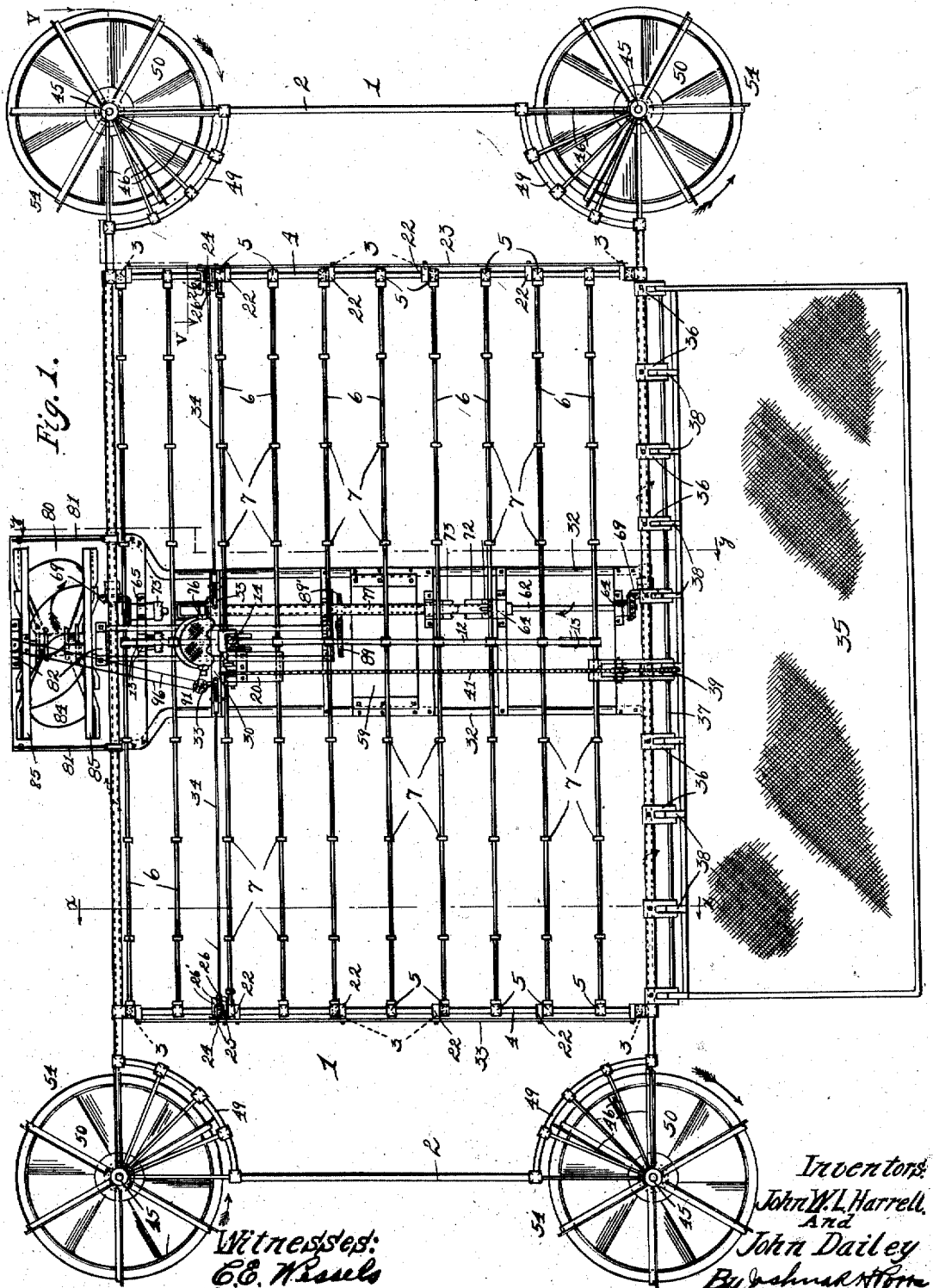

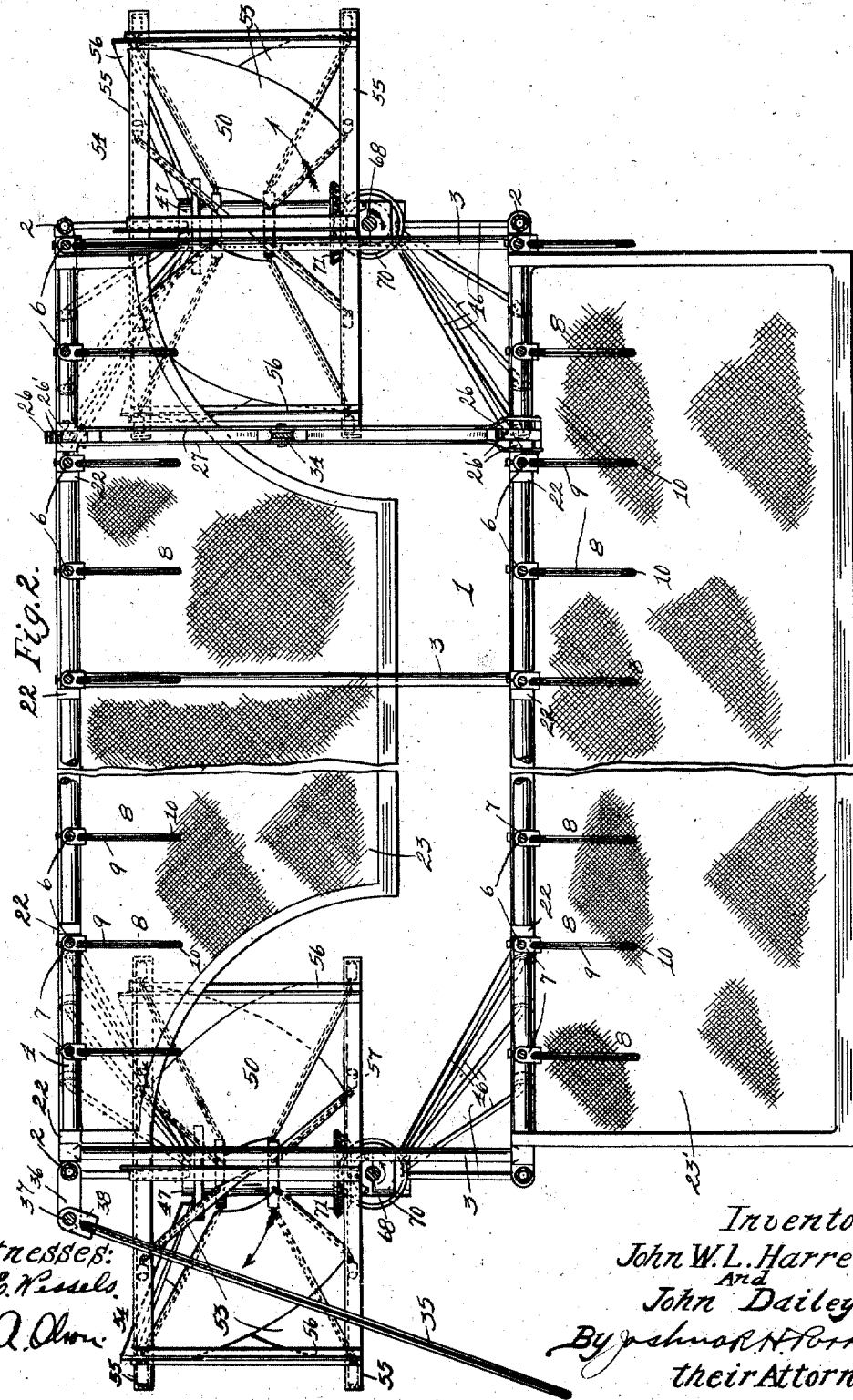

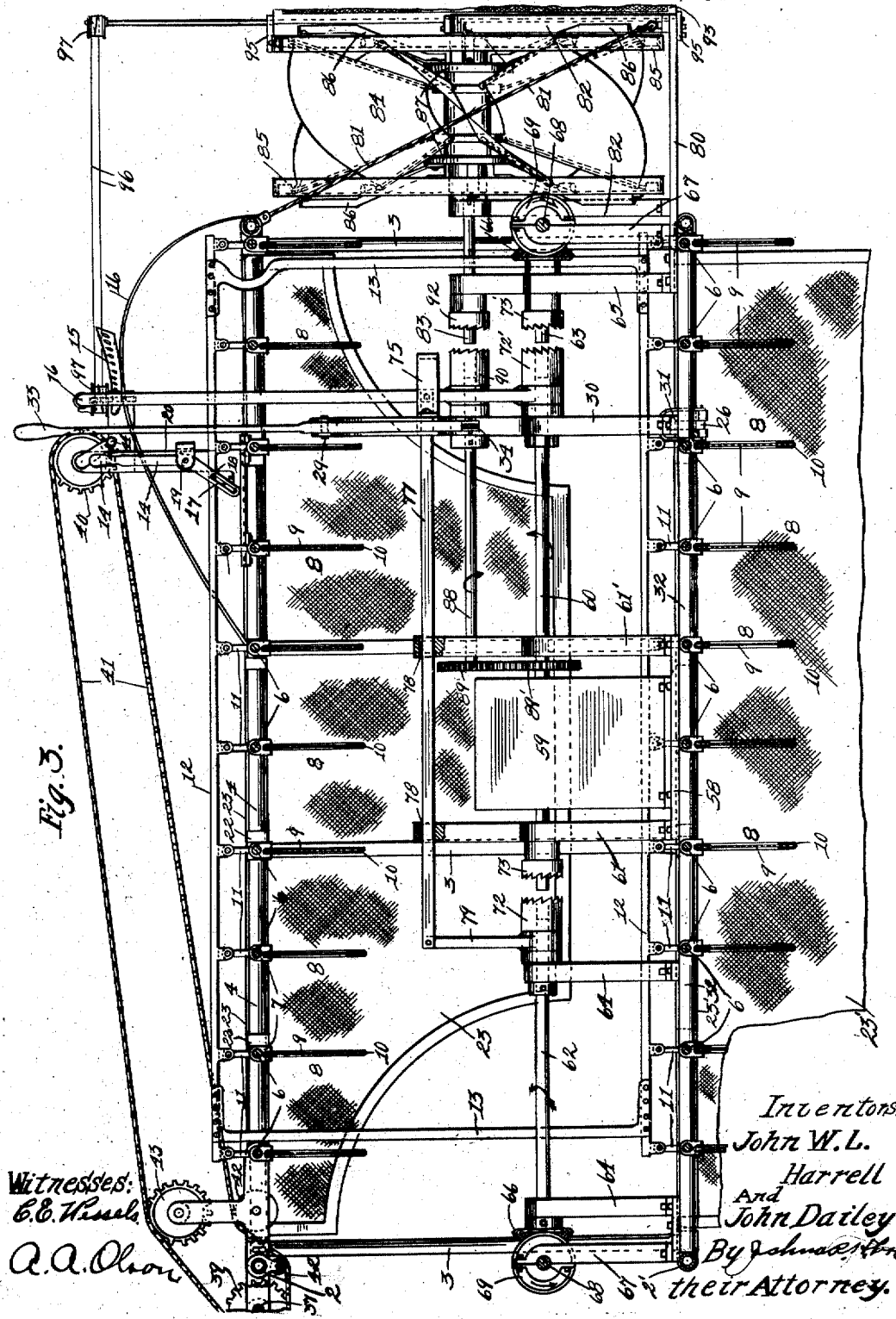

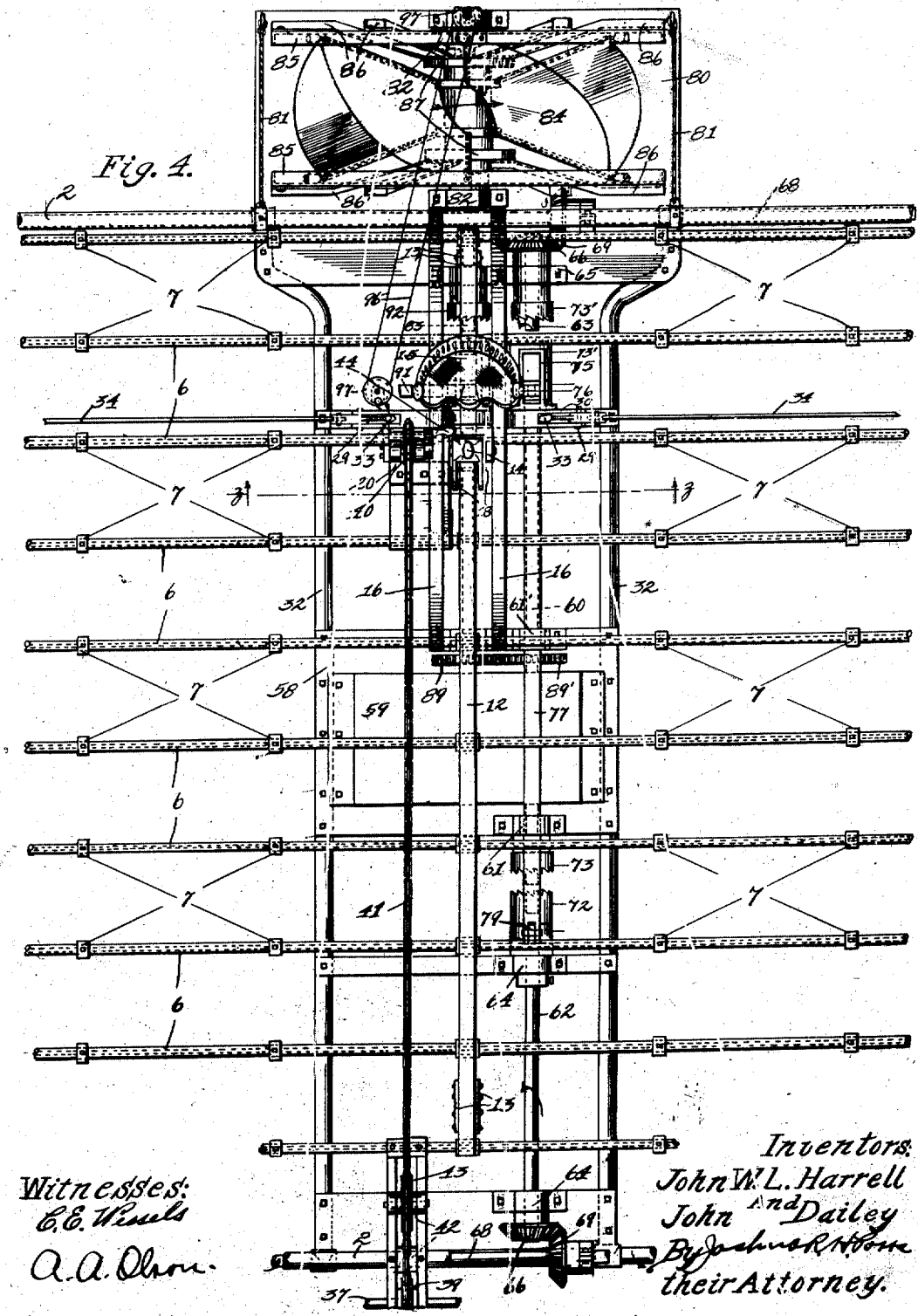

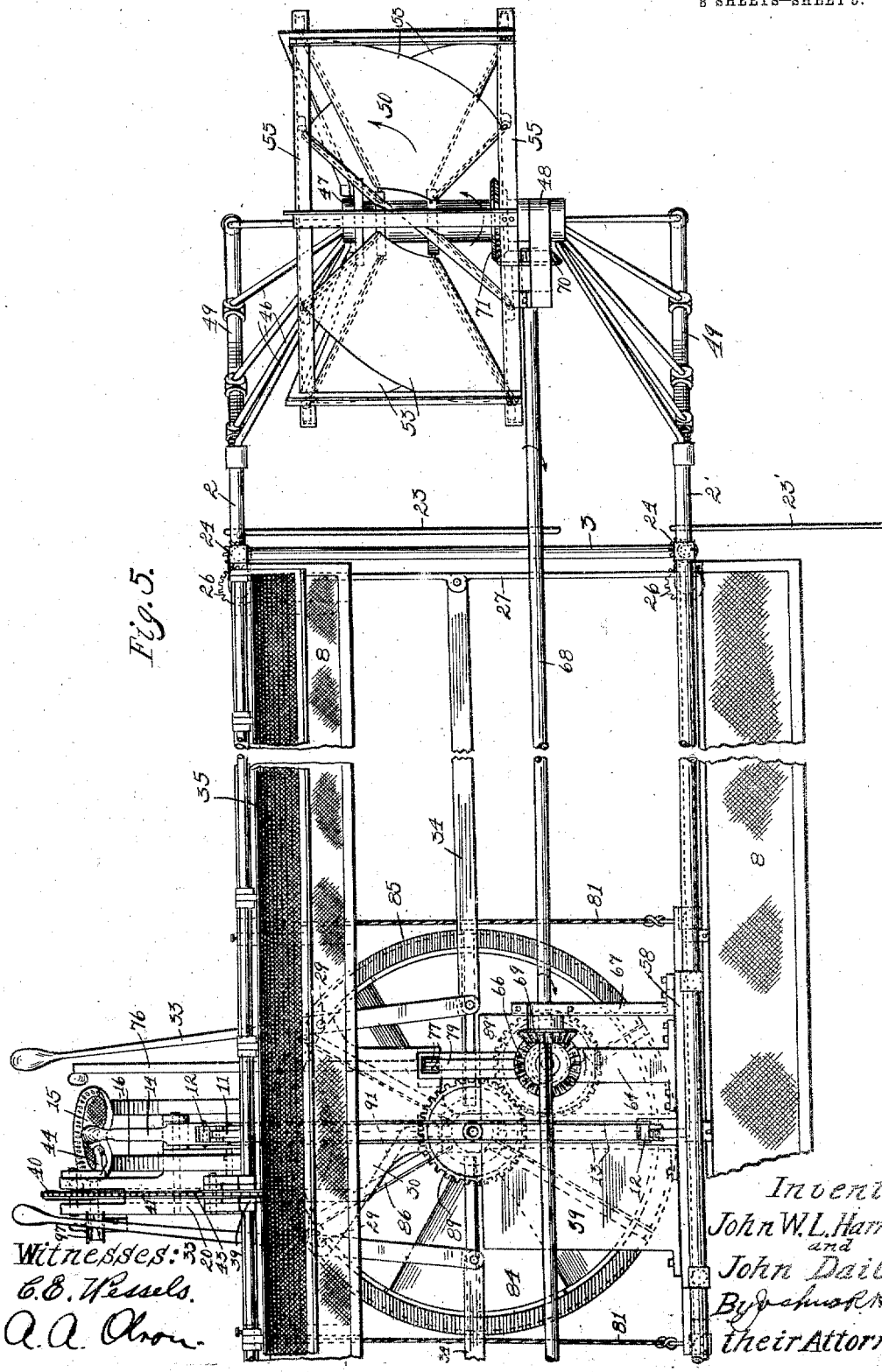

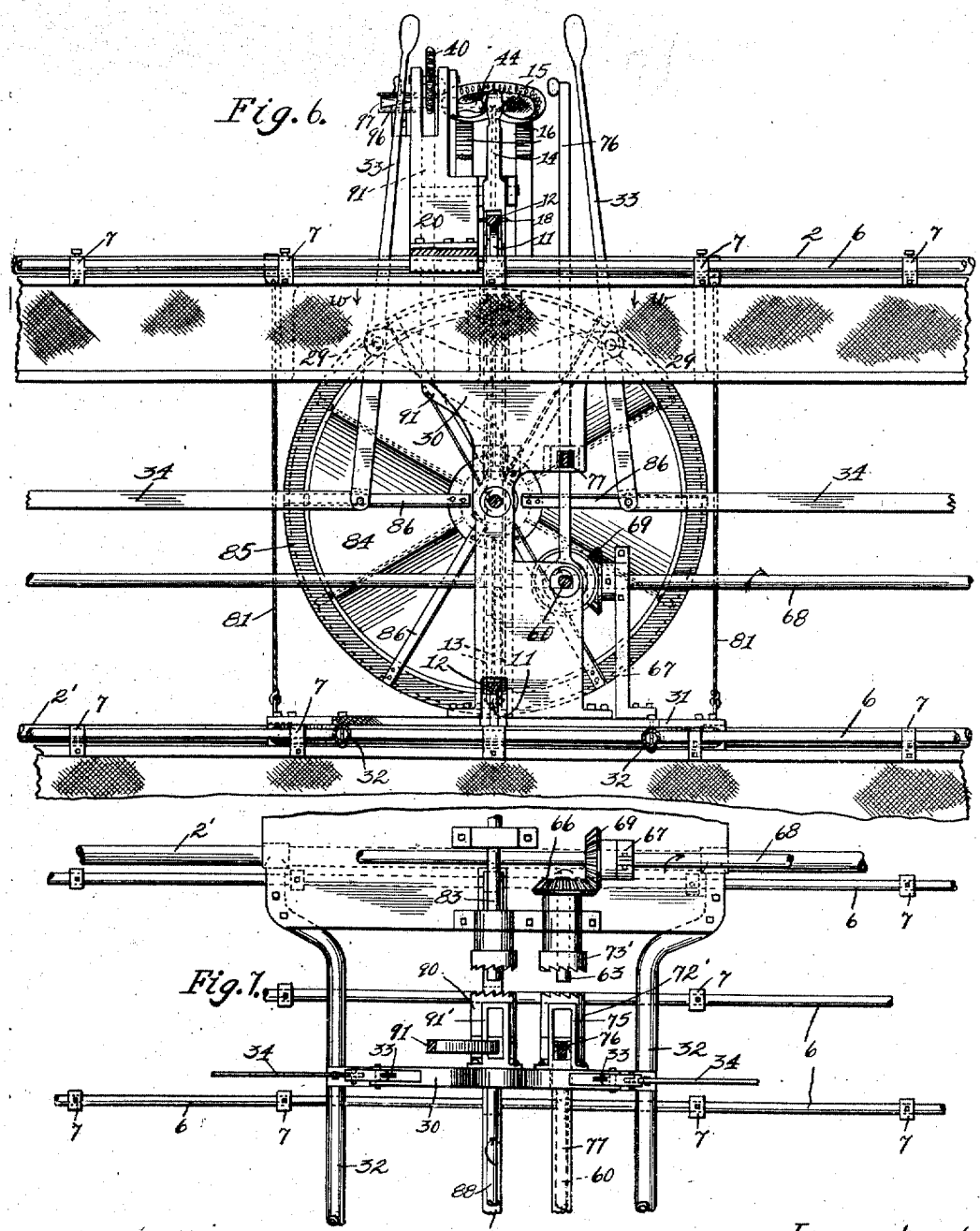

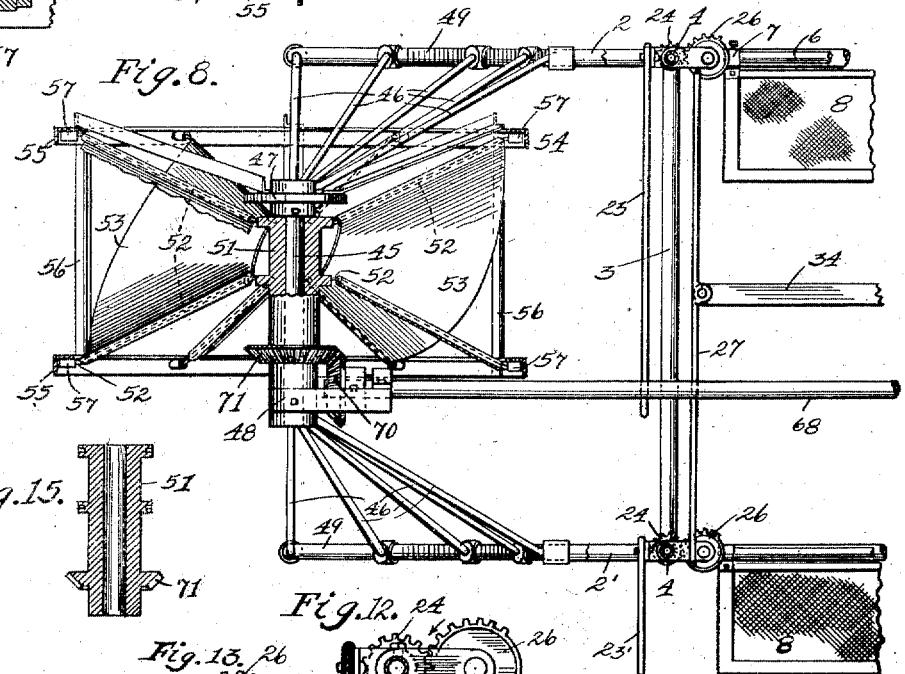

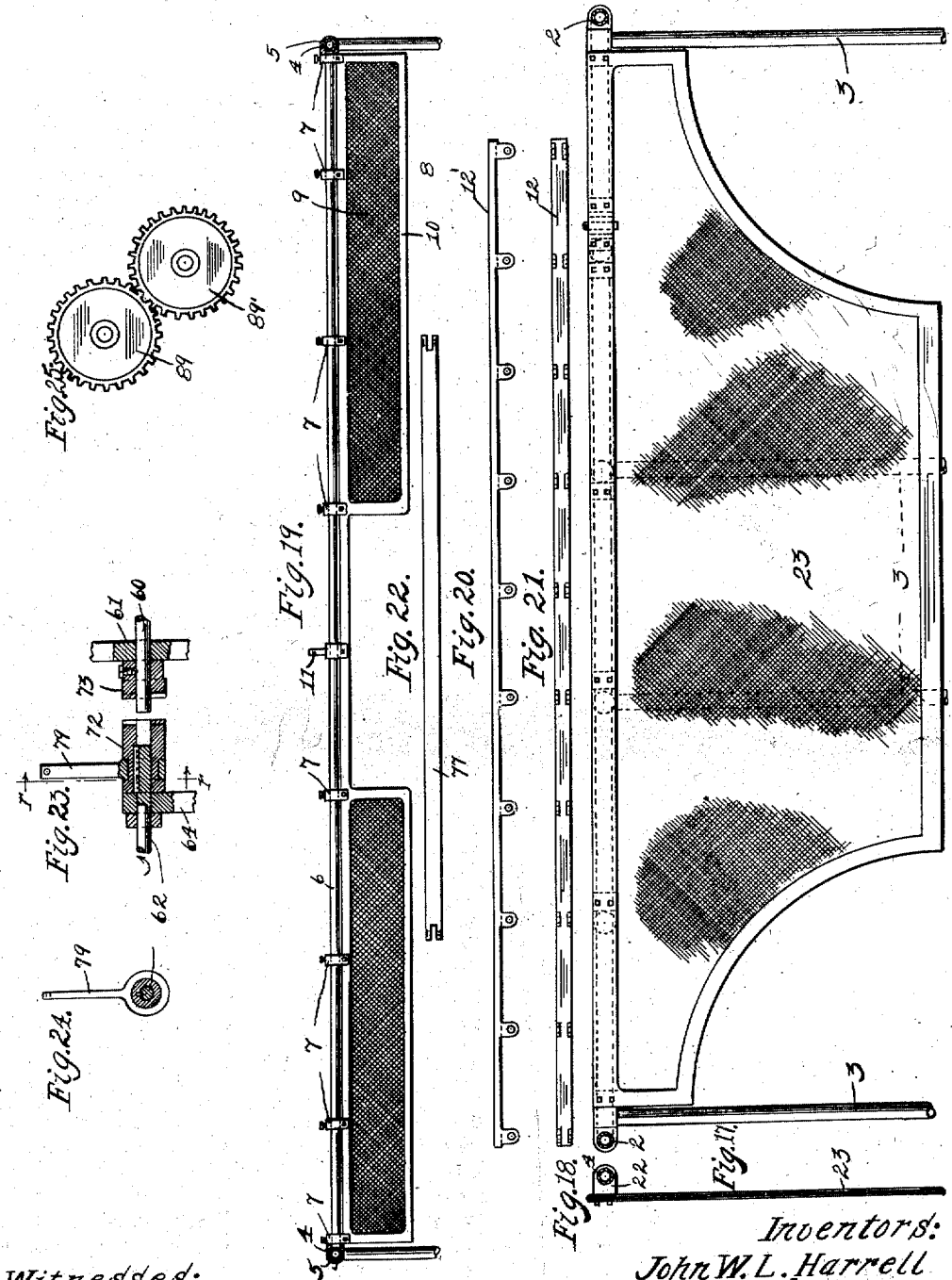

JOHN W. L. HARRELL AND JOHN DAILEY, OF ARGOS, INDIANA.

AEROPLANE.

983,707.

Specification of Letters Patent.

Patented Feb. 7, 1911.

Application filed July 30, 1909. Serial No. 510,360.

*To all whom it may concern:*

Be it known that we, JOHN W. L. HARRELL and JOHN DAILEY, citizens of the United States, residing at Argos, county of Marshall, and State of Indiana, have invented certain new and useful Improvements in Aeroplanes, of which the following is a specification.

Our invention relates to a craft for aerial navigation and more specifically to that class thereof known as aero-planes.

The object of our invention is to provide an aerial craft of the character mentioned in which will be provided means for effecting the elevation and ascension thereof without necessitating the attainment of a certain initial velocity such as, at the present time in aero-planes of popular design, is required before ascension may be accomplished.

A further object is the provision of an aero-plane as mentioned the planes in which will be comprised of adjustable swinging sections whereby the ready balancing and steering of the craft will be facilitated.

A still further object is to provide a plane which will be of the highest possible efficiency, and which will be strong and durable of construction.

Other objects will appear hereinafter.

With these objects in view our invention consists in an aero-plane characterized as above mentioned and in certain details of construction and arrangement of parts as will be hereinafter fully described and particularly pointed out in the appended claims.

Our invention will be more readily understood by reference to the accompanying drawings forming a part of this specification, and in which, Figure 1. is a top plan view of our device in its preferred form, Fig. 2. is an enlarged vertical section taken on the line $x\ x$ of Fig. 1, Fig. 3 is an enlarged vertical section taken on substantially the line $y\ y$ of Fig. 1, Fig. 4. is a top plan view of the central portion of the device, Fig. 5. is a front elevation of the right half portion of the device, Fig. 6. is a vertical section taken on the line $z\ z$ of Fig. 4, Fig. 7. is a horizontal fragmental section taken on the line $w\ w$ of Fig. 6, Fig. 8. is a vertical section taken substantially on the line $v\ v$ of Fig. 1, Fig. 9 is a top plan view thereof, Fig. 10 is a sectional detail illustrating the connection of the side wings of the device with the device frame, Fig. 11 is a section taken on the line $u\ u$ of Fig. 10, Fig. 12 is a more complete section of the construction shown in Fig. 10, Figs. 13 and 14 are enlarged side and end elevations, respectively, of one of the mutilated gears embodied in the construction shown in Fig. 12, Fig. 15 is a sectional detail of the hub of one of the horizontally disposed screw propellers embodied in our invention, Fig. 16 is an enlarged sectional detail taken on the line $t\ t$ of Fig. 9, Fig. 17 is a detail of one of the upper side wings, Fig. 18 is a section taken on the line $s\ s$ of Fig. 17, Fig. 19 is a side elevation of one of the sections of the upper sectional plane, Fig. 20 is a side elevation and Fig. 21 a bottom plan of a rod employed in the construction for connecting the series of plane sections, Fig. 22 is a detail of a connecting bar employed in operatively connecting two clutches embodied in the drive gearing of the device, Fig. 23 is a sectional detail of one of the clutches mentioned in the description of Fig. 22, Fig. 24 is a section taken on the line $r\ r$ of Fig. 23 and Fig. 25 is a detail of a pair of meshing gears embodied in the drive gearing.

Referring now to the drawings 1 indicates the frame of our device comprised in which are upper and lower parallelly extended rectangular frame parts 2—2' the same being rigidly connected at various points by vertically disposed posts 3. Longitudinally extended in each of the frame parts 2—2', are bars 4. Having their extremities rockingly mounted in bearings 5 secured to and preferably equally spaced apart upon bars 4 of each of the frame parts 2—2', are rods 6 rigidly secured by loops 7, to each of which, is a depending wing or plane-section 8 comprised of a light inner wind proof portion 9, preferably formed of a suitable fabric, and an outer rigid frame 10. Each of said wings is of a width slightly greater than the space between two successive rods 6, hence when said wings are rocked to a substantially horizontal position the same will slightly overlap each other to form one continuous plane. Upwardly projecting from the wings 8 of each of the frame parts 2—2', are alining arms 11 connected to the upper extremities of which is a transversely extending rod 12 such construction being clearly shown in Fig. 3. By such provision it is evident that by a single rocking actuation of the rods 12, the wings of plane-sections of each of the frame parts may be swung to overlapping horizontal position as before stated. By means of bars 13 extending between and having their respective extremities rigidly secured to the rods 12 of the frame parts 2—2', the rocking actuation of one of said rods 12 will simultaneously cause the rocking of the other, hence the two series of the wings 8 may be simultaneously actuated. In order to effect the rocking of the rods 12 as stated a lever 14 is provided, the same being positioned adjacent to the operator's seat 15 which is suitably mounted upon spring straps 16 secured to the frame part 2. The lower end of said lever is bifurcated to receive the upper rod 12, the same being provided with the elongated slots 17 which are engaged by pins 16 projecting from said rod 12. Said lever being pivotally secured as at 19 to a bracket 20 mounted upon and upwardly extended from two of the rods 6 of the frame part 2, it is clear that the position of the rods 12 and hence of the wings 8 may be readily governed by the rocking actuation of said lever.

Having their inner edges rockingly secured by means of loops 22 to the cross bars 4 of the frame parts 2—2' are substantially rectangularly formed wings 23—23', respectively, of a construction similar to that of the wings 8, before described. Rotatively mounted upon each of the bars 4 is a mutilated gear 24—Figs. 10-14, rigidly connected by means of brackets 25 to the adjacent edge of the wing 23—23' carried by the bar upon which each gear is mounted. Mounted between arms 26' rigidly secured to and inwardly projecting from each of the bars 4, is a mutilated gear 26 meshing with the gear 24. With such construction it will be observed, that the adjustment of any of the wings 23—23' may be effected by the proper rotation of the gear 26. Connecting the gears 26 mounted at the same side of the frame or mounted upon vertically alining bars 4, are rods 27 the latter being so connected with said gears, that upon an inward movement thereof from their position as shown, said gears will be rocked so as to simultaneously elevate the wings 23—23' to a horizontal position. Pivotally secured, as at 29, to the upper extremity of a bracket 30 rigidly secured upon a cross member 31 mounted upon cross bars 32 centrally traversing the lower frame part 2', are levers 33, the upper extremities of which are positioned adjacent to operator's seat, such construction being clearly shown in Fig. 6. Having their inner extremities parallelly secured to the lower extremities of the levers 33 and their outer extremities likewise secured centrally to the rods 27, as clearly shown in Fig. 5 are connecting links 34 by means of which, it is evident, operative connection is established between said levers and the wings 23—23'.

Arranged at the forward extremity of the frame 1 is a wing 35 of a construction preferably similar to that of the wings 8, the same being rockingly secured to the forward bar of the frame part 2 by means of lugs 36 rotatively secured to and forwardly projecting from said bar, the same embracing a rod 37 carried by and rigidly secured to lugs 38 formed upon the rearward edge of said wing. Fixed to the rod 37 is a sprocket 39 over which and a sprocket 40 mounted in the before mentioned bracket 20 travels a sprocket chain 41. Rollers 42 and a sprocket 43 interposed between said sprockets 39—40 serve as a means of guiding said chain so as to prevent the contacting thereof with the wings 8. By means of a crank 44 fixed to the sprocket 40, the angular disposition of the latter and hence of the wing 35 may be readily adjusted from the operator's seat. Said wing is provided for steerage in a vertical plane when the device is sailing, it being clear that with such provision any slight change in the angular disposition of said wing will cause the elevation or lowering, as the case may be, of the craft. Rotatably mounted upon each of the vertical shafts 45 arranged at the four corners of the frame 1 and held rigid by radially disposed rods 46 secured at their outer extremities to collars 47—48 pinned respectively to the upper and lower extremities of each of the said shafts and at their inner extremities to the curved corner bars 49 of the frame, is a horizontally disposed screw propeller 50. The outer corners of the wing 23 in order to accommodate the latter are cut away as clearly shown in Fig. 3. Comprised in each of said propeller screws is a hub 51, and radially projecting from and secured to said hub are a plurality of rods 52 to which obliquely disposed blades 53 are connected by having their longitudinal edges looped around pairs of said rods, as clearly shown in Fig. 8. Inclosing each propeller is a cage 54, the same being provided to form a reinforcement or backing for the propeller blades 53 when the latter are rotated. Comprised in each cage are two annular members 55 formed preferably of angle iron, the same being rigidly connected and spaced apart by transversely extending bars 56 the upper end portions of which are bent inwardly and rigidly secured to the collar 47. Said annular members 55 are of such diameter and are so disposed that rollers 57 provided upon the outer ends of the rods 52 of the propeller blades 53, will travel upon the under surface of the longitudinally disposed bars thereof; said blades, upon rotation, being through such provision, evidently braced against upward distortion, it being obvious that upon proper rotation of said propellers there will be a tendency to distort the blades thereof in the direction stated.

Mounted upon a plaform 58 suitably secured to and positioned upon the cross bars 32, is a power motor or any other suitable driving means 59, 60 indicating the power shaft thereof, which is journaled in bearing brackets 61—61' secured to the bars 62. Arranged in axial alinement with the shaft 60 forward and rearward of the latter, are shafts 62—63, respectively, the same being journaled in brackets 64—65 suitably secured to the frame parts 32. Fixed to the outer extremity of each of the shafts 62—63 is a beveled gear 66. Journaled in bearing-brackets 67 secured to the front and rear bars of the frame 2' are the transversely extended shafts 68 upon each of which is fixed a beveled gear 69 meshing with one of the gears 66. Fixed to either of the extremities of each of the shafts 68 is a beveled gear 70 meshing with a beveled gear 71 formed upon each of the propeller hubs 51, as clearly shown in Fig. 5. With such construction it is clear, that, upon rotation of the shafts 62—63, rotary movement will also be imparted to the propeller screws 50.

Splined to the rearward extremities of the shafts 62 and 60 are similar clutch heads 72—72' respectively, adapted, when moved rearwardly sufficiently, to interlock with coacting clutch heads 73—73' fixed respectively to the forward extremities of the shafts 60—63. Secured to and upwardly projecting from the clutch head 72 through a slotted guide member 75 secured to and rearwardly projecting from the bracket 30, is an actuating stem 76 the upper extremity of which is positioned in close proximity to the operator's seat. A rod 77 secured to and forwardly projecting from the stem 76 through guides 78 formed in the upper extremities of the brackets 61—61', and connected to an arm 79 secured to the clutch 72, operatively connects the stem 76 and arm 79 and whereby simultaneous movement of the clutch heads 72—72' is effected. With such construction, upon a rearward shifting of the stem 76 from the position thereof shown in Fig. 3 the co-acting clutch heads will evidently be brought to interlock effecting an operative driving connection between the power shaft 60 and the shafts 62—63. In such event a driving connection between the power shaft and the propeller screws 50 will evidently be effected; oppositely positioned ones of the latter being, with such construction, and as indicated by arrows, driven in opposite direction, whereby perfect equilibrium of the laterally acting forces incident to the rotation of said screws will be maintained.

Mounted upon a horizontal platform 80 supported upon the rear bar of the lower frame part 2' and by cables or other suitable members 81 secured at their upper extremities to the rear bar of the frame part 2, are bearing brackets 82 journaled in which is a shaft 83 upon which is carried a vertically disposed screw propeller 84 of a construction similar to that of the propeller screws 50 before described. Annular members 85 encircling said screw and rigidly supported by inwardly extending bars 86, the inner extremities of which are suitably secured to stationary collars 87 mounted upon the shaft 83 serve in the same capacity as the members 55 of the cages 54.

Arranged in axial alinement with the shaft 83, the same being suitably journaled in the bearing brackets 30—61', is a countershaft 88 operatively connected by gears 89—89' with the power shaft 60. Splined to the rearward end of said shaft is a clutch head 90 slidably operated by means of an actuating stem 91 secured to and upwardly projecting from said head through a slotted guide 91' rearward projecting from the bracket 30 to a position adjacent of operator's seat. Fixed to the forward end of the shaft 83 is a clutch head 92 of a form adapting the same to coöperate with the head 90. With such construction, the operative connection of the propeller screw 84 and the power shaft 60 may be readily and quickly effected by a simple rearward shifting of the stem 91.

In the operation of the device described, the aeronaut being positioned in the operator's seat 15 and the motor being assumed to be running, upon desiring to make an ascension the wings 8, 23 and 23' are dropped to depending or vertically disposed position so as to offer less resistance when the device is rising, whereupon the propeller screws 50, by the shifting actuation of the clutch stem 76 are thrown in operation. Said screws, upon a requisite rotary speed being attained thereby, cause the elevation of the device. Upon a desired altitude being reached the wings or plane sections 8 and 23—23', by means of the lever 14—33 are rocked upwardly to horizontal position, forming in such position two parallelly disposed planes supported in the frame parts 2—2'. Upon so doing the propeller 84, by the rearward shifting of the stem 91, is thrown into operation and the propellers 50, by the return shifting of the stem 76, thrown out of operation, in which event the craft it will be found will glide gracefully and swiftly through the air buoyed up by the parallel planes before mentioned. By means of the wing 35 actuated from the operator's seat by means of the crank 44, the altitude of the craft in its movement through the air, may be accurately governed. The lateral steering of the device may be effected by the shifting of the weight of the operator in the device, or by an ordinary vertically disposed rudder blade 93 of suitable dimensions, hung upon pivotal lugs 95 secured to the platform 80 and the rear cage member 85, and operable from the operator's seat by means of flexible cords 96 traveling around pulleys 97.

By the provision of sectional planes as mentioned with the wings or sections 23—23' thereof at opposite sides of the machine independently operable as described the ready balancing of the device, when in operation, will be greatly facilitated.

In order to permit of the arrangement of the different shafts, levers, and actuating stems as described, it is necessary, as illustrated in Fig. 19 to cut away portions of a number of the wings or plane sections 8 at different places therein.

While we have shown what we deem to be the preferable form of our device we do not wish to be limited thereto as there might be various changes made in the details of construction and the arrangement of parts without departing from the spirit of the invention comprehended within the scope of the appended claims.

Having described our invention what we claim as new and desire to secure by Letters Patent is:

1. An aeroplane comprising a frame, parallel horizontal planes supported by said frame and each comprising a plurality of sections adapted to swing on parallel axes, and of greater length than the distances between said axes, upwardly extending arms on said sections, horizontal rods connecting all of said arms of each plane, bars rigidly connecting said rods forming frames, a plurality of horizontally disposed propeller screws and a vertically disposed propeller screw and means for throwing said horizontally disposed and said vertically disposed screws into and out of operation independently of each other and means for moving said frames to swing said plane sections, substantially as described.

2. An aero-plane, comprising a substantially rectangular frame, parallelly disposed planes horizontally supported in said frame, each of said planes comprising a series of swinging transverse sections, and a swinging longitudinally extended section arranged at either extremity of said series of transverse sections, means for simultaneously adjusting the angular disposition of the said transverse sections, means for independently adjusting the longitudinal sections mounted on opposite sides of said frame, horizontally disposed screw propellers arranged in said frame one at each corner thereof, a vertically disposed propeller screw arranged at the rearward end of said frame, a driving motor arranged in said frame, operative connections between said motor and said screws, clutches interposed in said connections whereby said horizontally disposed screws and said vertically disposed screw may be independently driven, a horizontally disposed rudder movable in a vertical plane arranged at the forward end of said frame, a vertically disposed rudder movable in a horizontal plane arranged at the rearward end of said frame, substantially as described.

3. In an aero-plane the combination of a substantially rectangular frame, substantially parallelly disposed horizontal planes supported in said frame, each of said planes comprising a series of swinging transverse sections and a swinging longitudinally extending section arranged at either of the extremities of said series of transverse sections, means for adjusting the angular disposition of said sections, horizontally disposed propeller screws mounted one at each corner of said frame, a vertically disposed propeller screw arranged at the rearward end of said frame, a power motor mounted in said frame, a shaft and gear connection between said motor and said screws, clutches interposed in said connections whereby said horizontally disposed screws and said vertically disposed screw may be independently driven, and rudder blades arranged at the forward and rearward ends of said frame for vertically and horizontally steering substantially as described.

4. In an aero-plane, the combination of a substantially rectangular skeleton frame, parallelly disposed sectional planes horizontally supported in said frame, a system of levers for adjusting the angular disposition of the sections of said plane, horizontally disposed propeller screws, arranged in said frame, one being mounted at each corner thereof, vertically disposed propeller screw mounted at the rearward end of said frame, each of said propeller screws both vertical and horizontal comprising a plurality of radially arranged inclined blades, stationary annular members for bracing said blades when in operation, driving means mounted in said frame, operative connections between said driving means and said screws whereby said horizontally disposed screws and said vertically disposed screw may be independently driven, a steering blade swingingly mounted on a horizontal axis at the forward end of said frame, means for adjusting the angular disposition of said blade, a second blade rockingly mounted on a vertical axis at the rearward end of said frame, and means for adjusting the angular disposition of said blade, substantially as described.

In testimony whereof we have signed our names to this specification in the presence of two subscribing witnesses.

JOHN W. L. HARRELL.
JOHN DAILEY.

Witnesses:
HELEN F. LILLIS,
JOSHUA R. H. POTTS.